United States Patent [19]
Edelson

[11] Patent Number: 5,722,242
[45] Date of Patent: Mar. 3, 1998

[54] METHOD AND APPARATUS FOR IMPROVED VACUUM DIODE HEAT PUMP

[75] Inventor: Jonathan S. Edelson, Hillsboro, Oreg.

[73] Assignee: Borealis Technical Limited, London, England

[21] Appl. No.: 573,074

[22] Filed: Dec. 15, 1995

[51] Int. Cl.⁶ .................................................. F25B 21/00
[52] U.S. Cl. ........................ 62/3.1; 62/259.2; 165/104.23
[58] Field of Search ................................ 62/3.1, 259.2; 136/205; 378/4; 165/104.23, 32, 96

[56] References Cited

U.S. PATENT DOCUMENTS

| | | | |
|---|---|---|---|
| 3,842,896 | 10/1974 | Rason et al. | 310/4 |
| 4,004,210 | 1/1977 | Yater . | |
| 4,463,798 | 8/1984 | Pogson et al. | 165/1 |
| 5,138,220 | 8/1992 | Kirkpatrick | 313/309 |
| 5,305,363 | 4/1994 | Burke et al. | 378/4 |
| 5,356,484 | 10/1994 | Yater et al. | 136/200 |

OTHER PUBLICATIONS

Phys.Review A, vol.26, No. 1, pp. 523–538 Yater, Physical basis of power conversion of energy fluctuations Jul. 1982.

*Primary Examiner*—William Doerrler

[57] ABSTRACT

A Vacuum Diode Heat Pump is optimized for the most efficient pumping of heat by utilizing a cathode and anode of very low work function. The relationship of the work functions of cathode and anode are shown to be optimized when the cathode work function is the minimum value required to maintain current density saturation at the desired temperature, while the anode's work function is as low as possible, and in any case lower than the cathode's work function. When this relationship is obtained, the efficiency of the original device is improved. It is further shown that contact potential difference between cathode and anode may be set against the effects of space charge, resulting in an improved device whereby anode and cathode may be set at a greater distance from each other than has been previously envisaged.

14 Claims, 1 Drawing Sheet

METHOD AND APPARATUS FOR IMPROVED VACUUM DIODE HEAT PUMP

BACKGROUND—FIELD OF INVENTION

The present invention is related to heat pumping apparatus, and in particular to an improved heat pump for refrigerators and similar devices in which contact potential assists current flow.

BACKGROUND—PRIOR ART

A heat pump, as used in refrigerators and similar systems, is a device which transfers heat from one place to another, generally against a thermal gradient. For example, in a refrigerator, heat is "pumped" from the cold box to the ambient air. This is commonly achieved by evaporating a refrigerant fluid. As the fluid evaporates, it takes up heat from its surroundings, a technique well known in the art. The resulting vapor is both moved to another part of the device and is adiabatically compressed. The now hot compressed vapor dissipates its heat to the surroundings and liquefies, whereupon the cycle may begin again.

All such devices are subject to wear insofar as they require the use of motorized elements and moving parts. Additionally, there is a danger that the compressor may be damaged if fluid condenses at the wrong stage in the process. Furthermore, such devices are noisy. Such devices are also inefficient, achieving in conventional refrigerating practise roughly one-half of the theoretical maximum efficiency, as set by Carnot heat engine theory.

Typically, compressors are relatively inexpensive when used in conventional refrigerators. But when they are used in applications of a different scale, they become increasingly expensive. For very small-scale applications a suitable compressor may cost more than the entirety of the rest of the device. In industrial-scale applications, such as cold storage rooms, the process also commonly requires the use of a motorized fan to cool the electric pump at an additional cost in energy consumption, noise, and expense.

Conventional refrigeration systems typically experience temperature fluctuations within the refrigerated compartment, caused by the "on" or "off" nature of the compressor based systems. They also suffer long delays when changing from one temperature to another. Previous refrigeration systems commonly used halocarbons as refrigerant fluids. These fluids are a known source of stratospheric chlorine, and are thus possibly linked to stratospheric ozone depletion. The use of such refrigerant fluids may be a cause of widespread public anxiety about possible environmental damage. Such fluids are increasingly likely to come under the control of environmental and other agencies. Improvements in the art have resulted in the use of hydrocarbon and halo-hydrocarbon fluids which do not deplete atmospheric ozone. These fluids can be made to operate as efficiently as halocarbons, but only in conjunction with improved design. These fluids also may be more expensive than conventional halocarbons. In any case, the problems of noise, wear and tear, temperature control and cost effectiveness at extreme scales of use are not addressed by these improvements.

In the prior art is the thermo-electric cooler or Peltier effect device. This device is a thermocouple operated in reverse, pumping heat from one junction to another while under the influence of an electric current.

Such devices are easily scalable and are particularly suited to small scale applications. They may also be used in multiple configurations to enhance the degree of heat transference obtainable. However such devices typically require expensive materials to produce, and are quite inefficient in their use of electricity.

In my previous disclosure, filed 1995 Mar. 7, titled "Electrostatic Heat Pump Device and Method", Ser. No. 08/401,038, two porous electrodes separated by a porous insulating material to form an electrostatic heat pump. In said device, evaporation and ionization of a working fluid in an electric field provided the heat pumping capacity. Such a device offers the scalability and lack of moving parts associated with the Peltier effect device but allows the use of cheap and environmentally friendly substances in the construction and as the working fluid of the cooling device.

The use of electrons as the working fluid is disclosed in that prior application. In my subsequent disclosure, filed 1995 Jul. 5, titled "Method and Apparatus for Vacuum Diode Heat Pump", Ser. No. 08/498,199, an improved device and method for the use of electrons as the working fluid in a heat pumping device is disclosed. In the Vacuum Diode Heat Pump, a vacuum diode is constructed using a low work function cathode. A negative potential bias is applied to the cathode relative to the anode, and electrons are emitted. In the process of emission the electrons carry off kinetic energy, carrying heat away from the cathode and dissipating it at an opposing anode. The resulting heat pump is more efficient than conventional cooling methods, as well as being substantially scalable over a wide range of applications. Fabrication using conventional microelectronic fabrication techniques is possible. The Vacuum Diode Heat Pump is described in greater detail below, following a discussion of the principles involved in its design and construction.

The present application discloses an improvement to said Vacuum Diode Heat Pump, wherein the work function of the anode is specified to optomize efficient operation.

BACKGROUND—ELECTRON DEVICES

All electron devices require a physical source of electrons in the form of a cathode. Traditionally, cathodes for vacuum tubes and cathode ray tubes used thermionic emission to produce the electrons. This requires raising cathode materials to very high temperatures either by direct conduction of current or through the use of auxiliary heaters. The process is inefficient, requiring relatively high currents and dissipating much energy as heat to the surrounding area.

Recently, there has been substantial investigation of replacements for the heated thermionic cathodes. Specifically, "cold cathode" devices have attracted much attention. These cathodes may be very efficient because they eliminate the need to heat the cathode material.

There are three types of cold cathode known to the art. The field emission type of cold cathode device emits electrons from the tip of an emitter cone. In the tunnel type of cold cathode device, electrons pass through a thin insulating film by the tunnelling effect. In the avalanche type of cold cathode device, the electrons emitted are a fraction of a current that flows through a reversely biased p-n junction of a diode orientated such that the junction is parallel to the surface of the emitter.

While these cold cathode structures can be made in almost any size and may have many applications as single units, their best performance and major application is expected to come from extreme miniaturization, in structures formed of dense arrays. All three types of cold cathode may be manufactured in microscopically small sizes by techniques well known in the art of semiconductor microelectronics fabrication.

For example, silicon thin-film technology has now advanced to the point where cold cathode structures may be manufactured in arrays of up to 5000 cathodes at packing densities of up to 640,000 per square centimeter.

Cold cathode structures are useful electron sources for applications such as displays, vacuum microelectronic devices, and electron microscopes. Additional electrodes may be, and commonly are, used to collect and/or control the electron current. This technology is presently undergoing extensive development, with many articles being published and numerous patents being issued. Work in the art has been focused on the development of better emissive structures and materials, the use of such devices in electronic applications, and enhanced methods of fabricating such devices as well as fabricating integrated devices. The use of such devices for pumping heat is unknown in the art.

BACKGROUND—THERMIONIC EMISSIONS

All material may be characterized by a "work function". The work function is the quantity of energy required to move a single electron from the surface of a neutral sample of the material to free vacuum. Generally the work function is measured in electron volts. This work function may be considered a potential barrier to the escape of electrons from the material.

A similar measure used to describe insulating materials is "Electron Affinity".

The conduction band electrons of a conductor exhibit a distribution in kinetic energy, much as the individual molecules of a gas move at widely varying speeds. This distribution is related to the common Boltzman distribution, often encountered in studies of thermodynamics. Some fraction of the electrons present in the conduction band of the conductor will be moving at such a speed and in such a direction that they may overcome the potential barrier of the work function, and escape the conductor. Positing a lone conductor in space, the escaping electrons will cause a negative charge to be built up in the region surrounding the conductor, while the conductor acquires a positive charge. However, when additional circuit elements are added and an external electric field is applied, a current can be caused to flow; electrons escape from the cathode, are carried by the electric field to the anode, and are then carried back to the cathode via a conductor. If the source of electric potential is part of the return circuit, then the device is a standard vacuum diode. If the load is additionally part of the return circuit, then we have a vacuum thermionic converter, using the heat applied to the cathode in order to produce an electric current flow. The latter device is well known in the prior art.

The cooling of conventional thermionic cathodes by electron emission is a known side effect of thermionic emission, mentioned and then ignored in texts on vacuum tubes, and fully expected from the above understanding of thermionic emission. The electrons which escape the surface of the cathode are selected by the work function to be those with the highest energy, thus the remaining electrons have a lower average kinetic energy, and thus a lower temperature. As long as heat is added to the cathode, additional hot electrons will be produced, and electrons will continue to be emitted. For vacuum tube use, thermionic cathodes are heated to temperatures of 1000 K. or above in order to achieve appreciable thermionic emission. At these temperatures, the cathodes dissipate considerable heat by radiation, generally considerably more than that carried away by the "evaporation" of electrons. Other then my previous disclosure of the Vacuum Diode Heat Pump, no direct use of thermionic emission for cooling and heat pumping was known, the cooling being a known yet undesired aspect of cathode operation.

BACKGROUND—VACUUM DIODE HEAT PUMP

The Vacuum Diode Heat Pump implies a substantially new field of applications for field emission cathode technology, as well as other cold cathode technologies. The method may be successfully exploited using field emission cathode devices, tunnel cathode devices, or avalanche cathode devices.

In the Vacuum Diode Heat Pump, such cold cathode technologies are used to lower the effective work function of the electrodes. Field emission in and of itself will not cool a cathode. However, there is always some degree of thermionic effect associated with field emission. It is this thermionic emmission, in the case of the Vacuum Diode Heat Pump, that causes the cooling effect. This cooling effect has never been described in the prior art (except by my previous applications) for use in a cooling device.

A diode is connected to a power supply such that a negative bias is applied to the cathode relative to an anode, as in the conventional operation of a vacuum diode. Additionally, said cathode is thermally coupled to a mass to be cooled, at the same time as said anode is thermally coupled to a mass to be heated. Upon application of bias voltage, electrons will be emitted from said cathode and collected at said anode. The thermionic emission of electrons will cause heat to be carried away from said cathode, whilst the collection of electrons at said anode will cause heat to be released at said anode, the net result being that heat is pumped from said cathode to said anode, and by the thermal coupling, heat is pumped from said mass to be cooled to said mass to be heated. Through adjustment of the applied voltage, current flow may be regulated, and the rate of heat pumping controlled in a continuously variable fashion. Such control will allow for more stable maintenance of temperatures.

The determination of necessary work function for the cathode is as follows. Electrons escaping the surface must carry away a minimum of one work function worth of energy. Owing to the distribution of electron energies, the electrons actually escaping the surface will carry away on average twice the work function in energy. Work function is often expressed in terms of electron-volts and may be convened to more standard units as follows: the amount of energy carried by a single electron expressed in electron-volts is numerically equal to the amount of energy carried by one ampere-second of electrons when the latter energy is expressed in watt-seconds. For the work-function presented above, the average electron will carry 0.6 eV of energy, thus one ampere-second of electrons will carry away 0.6 watt second of energy, or a current of one ampere will carry away thermal energy at a rate of 0.6 watt.

The maximum current per unit area is determined by the number of electrons which have enough kinetic energy to escape the surface of the conductor. The higher the work function, the fewer electrons capable of escaping. The higher the temperature, the greater the quantity of electrons which are capable of escape. The following semi-empirical equation, known as Richardson's Equation, relates these factors:

$$I_s = AT^2 e^{(-w/kT)}$$

Where $I_s$ is the current per unit area, T is the absolute temperature, k is the Boltzman gas constant, and A is a semi-empirical "constant".

Raising the work function will reduce the number of electrons emitted, but each electron will carry away a greater amount of heat. Likewise, lowering work function will allow for greater electron flow. In general, heat carried per unit charge scales linearly with work function, whilst saturation current scales as an inverse exponential of work function. Thus, for any given temperature, a trade-off may be made between the current flow and the energy carried by each electron, and at a given temperature and area specific heat pumping requirements, a single optimal work function and current density may be determined.

By way of a specific example, the cathode may be characterised by an electrode surface with a work function of approximately 0.3 eV for applications involving cold side temperatures on the order of 273 K. Higher work functions are acceptable for applications involving higher temperatures whilst lower work functions will be required for lower temperature operation.

The example work function is consistant with a saturation current density of between 10 and 100 amps per $cm^2$, a reasonable range of values for cooling microelectronics.

Low work function cathodes have been developed by the electronics industry for use in flat panel displays, as well as so called Vacuum Micro-Electronic Devices. Various methods, generally employing conventional photolithographic techniques well known to the microelectronics fabrication industry, are used to produce such cathodes. As currently used in the art, such micro fabrication techniques manipulate the shape of the work function potential barrier using quantum mechanical effects. These effects can be used either to allow externally applied energy to extract electrons from the electrodes, or can be used to lower the effective work function of the material allowing low temperature thermionic emission. Microelectronic mass production techniques allow such devices to be produced in large quantity at low cost.

Current flow in vacuum diodes is additionally limited by space charge effects. These effects are well known, and described by Childs' Law, as follows:

$$I_s = 2.34 \times 10^{-6} \frac{e_b^{3/2}}{d^2} \text{ amp cm}^2$$

Where $e_b$ is the voltage applied between anode and cathode, and d is the distance between anode and cathode expressed in cm, and $I_s$ is the current per $cm^2$. As can be seen, very small distances between anode and cathode, or large surface areas, are required in order to minimize the voltage required to obtain requisite current flow. Any increase in voltage will result in reduced heat pump efficiency.

From the previous relations, it can be seen that the distance between cathode and anode must be small, work function must be relatively low, and currents must be high.

The above description shows that a current between the cathode and anode will be capable of pumping heat from cathode to anode. Furthermore it is shown that a voltage will need to be applied between cathode and anode to overcome space charge effects. However, a heat pump requires a certain innate energy input, described by the Carnot efficiency. This energy input requirement means that a higher voltage, over and above that required by space charge effects, must be applied to the electrodes. Essentially, the laws of thermodynamics require a potential difference between cathode and anode in order to pump heat, and a further potential difference is required by the laws of kinetics, specifically in their relation to space charge effects, in order to pump said heat.

The thermodynamic voltage requirement may be simply calculated by determining the Carnot work required to pump the specified mount of heat from the cathode to the anode. Using the known current flow and the relationship that energy equals charge time voltage, the voltage may be calculated by dividing the Carnot power requirements by the current flow between electrodes. As can be seen, if the Carnot power requirements are negative, for example if the cathode is hotter than the anode, power may be extracted from the system. This is the Thermionic Converter, a well known device for converting thermal power into electrical power.

An example system will serve to illustrate the Carnot requirements. Two 0.3 eV electrodes, one at 45° F., the other at 125° F., moving 1 coulomb of charge would move 0.6 joule of heat. Therefore:

$$\frac{\overline{q_1}}{T_1} = \overline{q_2} \frac{0.6J}{280K} = \frac{\overline{x}}{325K} \therefore x = 0.6943J$$

So to move 0.6 J of heat from cold to hot requires 0.094 J of Carnot work. To move this heat, one ampere-second of electrons was used, and 0.094 watt-seconds of work, giving a voltage in this example of equilibrium of 0.094 V. This 0.094 V will be in addition to any voltage required to overcome space charge effects.

This is the voltage at equilibrium, with no heat pumping action. But for the purposes of the example given, it is necessary to know the operational voltage with a heat pumping action.

Thus it may be seen that in order to pump heat, reversable work must be done, and we can calculate this work using the Carnot relations. Further, in order to pump heat at a finite rate, we must do dissipative work in order to get a finite current flow. The major dissipating factor is caused by space charge. The relation between current, voltage and spacing is Child's Law, as mentioned above. In my previous application, it is presumed that the electrodes will be separated by micro-machined structures. For example, the surface of each electrode may be coated with a layer of insulating oxide, etched away in strips so that the strips on one electrode are of a different orientation to the strips on the other. By pressing the two surfaces together, a tiny space is created between areas of each electrode where no oxide coating is present. The electrodes would thus be separated by a distance equal to twice the thickness of the oxide layer. A figure of 0.1 µm is proposed for the purpose of this example, which is an order of magnitude in keeping with known results in microelectronics fabrication know to the art. Microfabrication techniques may also be used to form both cathode and anode separated by a soluble temporary support structure. The support structure may be etched away, leaving appropriately spaced electrodes.

Assuming, then, a distance of 0.1 micron between the electrodes, the voltage needed to push 10 amperes per square centimeter becomes, using Child's Law, 0.0057V, in addition to which must be added the 0.0943V required to achieve equilibrium, as described above, giving an overall figure of 0.1V. As can be seen from the accuracy of the initial data going into these calculations, the final number shows more apparent precision that is appropriate. It is more correct to say that the voltage requirements for the present example are 0.1V required by Carnot, and 0.06V for space charge effects. Thus the device operates within a few percent of the theoretical maximum of Carnot efficiency. Contact potential difference from using an anode of lower work function than that of the cathode will tend to reduce space charge effects, and may be used to enable larger plate spacing whilst maintaining efficiency.

Expanding from this, slightly more than one watt of external power will move six watts of heat, or approximately 20.5 BTU/hr.

By way of comparison with conventional refrigerators, a typical device pumping 6000 Btu/hr of heat will consume 600 W of power, against 370 W utilising thermionic field emission cathodes, rendering the thermionic field emission method 60% more efficient in energy consumption than conventional methods.

OBJECTS AND ADVANTAGES

Accordingly, besides the objects and advantages of the methods of pumping heat in refrigerators and similar devices described in my above patent, several objects and advantages of the present invention are as follows:

An advantage of the present invention is the elimination of inefficiencies arising from the use of chemical working fluids.

It is accordingly an object of the present invention to provide an improved method of refrigeration which is more efficient than previous methods.

Another advantage of the present invention is the elimination of the cost associated with utilising a chemical working fluid.

Accordingly it is a further object of the invention to provide a method of refrigeration which is less expensive than previous methods.

Another advantage of the present invention is that it provides greater flexibility and scalability in the creation of refrigeration devices allowing a manufacturer of such devices to manufacture devices of many different shapes and sizes and physical properties.

Another advantage of the present invention is that it allows for a cost-effective cooling device over the entire product and size range.

Accordingly it is a further object of the present invention to provide a method of refrigeration which may be applied to devices of very small and very large scale, as well as being used for any device which currently uses conventional heat pumping technology.

Accordingly it is an object of the present invention that it provides a universal means of pumping heat such that it is suitable for all known applications where the pumping of heat is required.

Another advantage of the present invention is that it provides a new use of what previously was an undesired side-effect of electron emission.

Accordingly it is an object of the present invention to utilise a cold cathode for the purpose of pumping heat.

Another advantage of the present invention is that it provides an improvement upon the Vacuum Diode Heat Pump.

Accordingly it is an object of the present invention to provide a Vacuum Diode Heat Pump of greater efficiency than previously disclosed Vacuum Diode Heat Pumps.

Accordingly it is another object of the present invention to specify the requirements for the relationship between anode and cathode in a Vacuum Diode Heat Pump.

Another advantage of the present invention is that it allows for a greater distance between the cathode and anode of a Vacuum Diode Heat Pump than was previously regarded as practical.

Accordingly it is an object of the present invention to eliminate the need for costly and difficult fabrication techniques related to the spacing between anode and cathode of a Vacuum Diode Heat Pump.

Still further objects and advantages will become apparent from a consideration of the ensuing description.

DRAWINGS

REFERENCE NUMERALS IN DRAWINGS

21) Cathode with low work function
22) Anode with low work function
23) Externally applied voltage
24) Anode with high work function

DESCRIPTION OF THE INVENTION

A Vacuum Diode Heat Pump is constructed according to the principles outlined above, and disclosed in my previous application filed 1995 Mar. 7, titled "Electrostatic Heat Pump Device and Method", Ser. No. 08/401,038. My previous disclosure did not specify the anode work function required for efficient operation.

In said heat pump, a cathode and an anode with very low work functions are disposed so as to face each other, separated by a vacuum gap. On the application of an externally applied voltage, electrons are emitted from the cathode and cross the vacuum to arrive at the anode. In a Vacuum Diode Heat Pump, these electrons carry energy in the form of heat away from the cathode, and release this energy at the anode, returning through the circuit to the cathode. Thus the cathode becomes cooler, and the anode hotter, relative to the ambient temperature surrounding the device. The device may thus be used to cool objects or spaces in the immediate vicinity of the cathode, drawing heat from those objects or spaces and releasing it to the objects or spaces in the immediate vicinity of the anode.

In the present invention, the work function of the anode is specified to be of lesser magnitude than the work function of the cathode. To properly disclose the operation of the device under this condition, the question of the relationship between cathode and anode must be discussed.

Figure 1A:
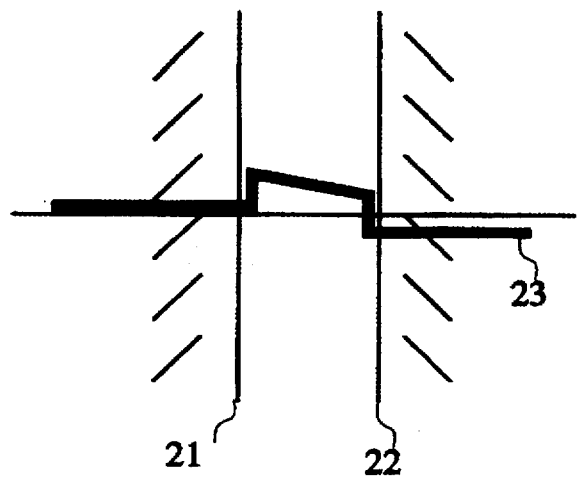
FIG. 1a shows, in schematic form, the potential profile with an efficient relationship between the work functions of cathode and anode in a Vacuum Diode Heat Pump.

In constructing such a device, attention is paid to the precise relationship of the work function of the cathode to the work function of the anode. There are three possible relationships: that these work functions are equal; that the work function of the cathode is greater than the work function of the anode; and that the work function of the cathode is less than the work function of the anode.

Where the work functions are equal, a small externally applied voltage is sufficient to create a current flow. This is represented schematically in FIG. 1a, where cathode 21 and anode 22 share the same work function. Where a voltage is applied, the overall pattern of externally applied voltage 23 shows an efficient use of the work performed.

Figure 1B:
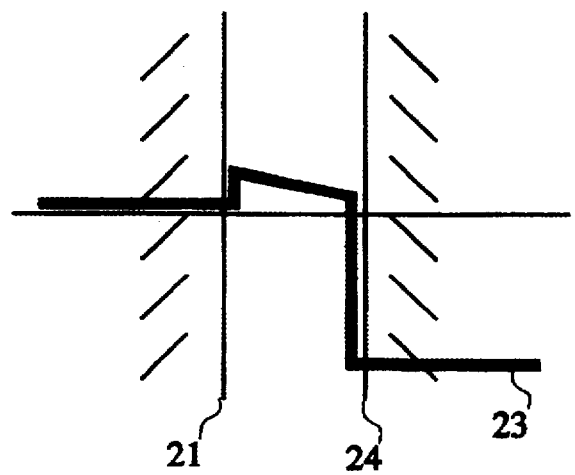
FIG. 1b shows, in schematic form, the potential profile with an inefficient relationship between the work functions of cathod and anode in a Vacuum Diode Heat Pump.

But where heat is to be pumped from a cathode of low work function to an anode of a higher work function, to maintain the same level of current flow as with electrodes of equal work function a greater external voltage must be applied. The greater the difference in work functions, the greater the voltage, and consequently, the efficiency of the device is impaired. This is illustrated graphically in FIG. 1b, where anode 24 is of a high work function, requiring much greater work to be performed by externally applied voltage 23 in order to pump heat.

Consequently, in the preferred embodiment of the present invention, the cathode will have a work function low enough to obtain an electron emission determined as saturation current density at operational temperatures, and an anode work function which is as low as possible.

There are three limiting factors on the pumping of heat from cathode to anode, which should be noted. The first is the initial barrier height, that is, the work which must be done in order to separate an electron from the body of the cathode in order to create current flow. This is a kinetic limit on the current flow.

Secondly there is the limiting factor of the space charge region between the electrodes. Electrons in this region travel from a region of high potential to a region of low potential. Electrons in this region alter their potential profile and thus self-regulate the total current flow.

Thirdly, there is the limit of thermodynamic potential. The bulk energy levels of the electrons in the anode and the cathode will move from the hot side to the cold side unless the potential of the hot side is sufficiently below that of the cold side. The minimum potential difference is set by the Carnot formula.

In the case where the work function of the anode is greater than the work function of the cathode, the contact potential difference causes an additional kinetic barrier, thus substantially reducing current flow.

In the preferred embodiment of the present invention, where the work function of the anode is lower than the work function of the cathode, it would appear at first sight that the potential of the anode may be greater than that of the cathode. Only a small amount of the heat carried by a single electron would be transferred to the anode, and the electron would return through the circuit to the cathode carrying a load. Little heat is exchanged, but instead, it is converted to electricity. This is the thermionic converter of heat to electricity well known to the art.

However, the laws of thermodynamics require that for heat pump operation the potential of the anode be maintained below that of the cathode, by means of an externally applied potential. This is as expected, insofar as heat pumps require the external input of work.

Thermodynamic science states that the electrons will reach an equilibrium based on the potential of the cathode and the anode and their temperatures respective to each other. The rate of electron flow depends upon the height of the barrier as seen from the hot side, which must be larger than the barrier as seen from the cold side.

But the higher this barrier, the less the current and heat pumping effect, for a given external voltage. And the lower the barrier, the less heat will be absorbed by the electron as it struggles to break free and form part of the current.

To optimise the efficiency of the process for the purpose of the preferred embodiment of the present invention, the cathode is constructed with a work function of precisely the level required to allow for maximum current flow, calculated according to the other limits mentioned above, and no greater. The work function of the anode may then be set at a lower level than the work function of the cathode, and for the purposes of the preferred embodiment of the present invention, as low as possible.

By way of example, if a cathode with a work function of 0.3 eV is separated from an anode of 0.1 eV by a space of 1 µm, rather than the 0.1 µm referred to in the background to the Vacuum Diode Heat Pump given above, Child's Law requires 0.2V of voltage to overcome the space charge, but this is provided by the contact potential difference. Thus through the use of a low work function anode, electrode separation may be increased without incurring space charge penalties to the efficiency of the device.

It should be noted that if the distance between the electrodes can be increased then there are many more options for the method of fabrication. 0.1 µm is currently challenging in the art, whereby 1 µm is easier to construct. In such circumstances, it is likely that both the cathode and anode are fabricated at the same time using microelectronic fabrication techniques in order to maintain them at appropriate spacing. Owing to the close spacing of the cathode and anode, and the possibility that both may be fabricated together, it becomes meaningful to envisage a sheet like structure where one side is characterised by absorbing heat, and the other side by rejecting heat.

As an example mode of operation for conventional refrigeration and air conditioning service, currents on the order of 10 amp/cm$^2$, cathode work function of 0.3 eV, 0.1 eV anode work function, and electrode spacing of 1 µm provide a good initial basis for the necessary engineering trade-offs. The necessary spacing between electrodes may be obtained using conventional microelectronic fabrication techniques. Of primary importance in the development of thermionic refrigeration is the production of a low work function electrode.

SUMMARY, RAMIFICATIONS, AND SCOPE

It may be seen from the above description that this improved method for pumping heat admits of a wide variety of applications.

All applications previously possible with the use of a Vacuum Diode Heat Pump are retained, including the use of a Vacuum Diode Heat Pump with an array of cathodes and anodes, as well as single pairs of cathode and anode.

Different types of cathode may still be used. Further, the actual work function of the cathode may be high, where high temperatures are involved, as long as the anode retains the same relationship to the cathode, namely, that the anode has a lower work function than the work function of the cathode.

Thus it may be seen that the present invention offers a means of optimizing a Vacuum Diode Heat Pump such that heat may be pumped at optimum efficiency for the desired temperatures involved.

In one group of possible embodiments, the work functions of both cathode and anode may be raised or lowered during operation, according to the principles of the invention as described, so as to retain optimum efficiency over a range of temperatures. In another group of possible embodiments, the applied external voltage may be changed in order to achieve a similar result.

The Vacuum Diode Heat Pump may additionally be used for a very broad range of cooling, tmeperature control, temperautre regulation, and other heat-pumping applications.

Although the description above contains many specificities, these should not be construed as limiting the scope of the invention but as merely providing illustrations of some of the presently preferred embodiments of this invention. For example, cold cathodes with higher work functions may be used when dealing with high temperatures.

The spacing of cathode and anode may also vary depending on the application involved and the addition of vacuum tubes to assist the flow of electrons from cathode to anode.

Thus the scope of the invention should be determined by the appended claims and their legal equivalents, rather than by the examples given.

I claim:

1. An apparatus for pumping heat comprising
   a) a vacuum diode, as cathode of said vacuum diode being in thermal contact with a mass from which said heat is to be removed, an anode of said vacuum diode being in thermal contact with a mass to which said heat is to be carried, said cathode of said vacuum diode having a work-function consistant with copious electron emission at the temperature of said mass from which heat is to be removed, said cathode being separated from said anode by vacuum,
   b) a supply of electrical power capable of supplying current at suitable voltage to said vacuum diode,
   c) said cathode of said vacuum diode being at a temperature of less than 400 degrees Centigrade, and said cathode of said vacuum diode being cooler than said anode of said vacuum diode, the improvement wherein being said anode of said vacuum diode having a work-function lower than said cathode of said vacuum diode, whereby contact potential between said cathode and said anode will act to reduce electrical losses owing to space charge effects.

2. The apparatus of claim 1 wherein said work-function of said cathode is low enough to ensure that said current is limited by space charge saturation between said cathode and said anode.

3. The apparatus of claim 2 wherein said work-function of said cathode is the maximum work-function consistant with said space charge saturation at said temperature of said mass from which heat is to be removed.

4. The apparatus of claim 2 wherein said work-function of said cathode is greater than the work-function of said anode, whereby a contact potential is generated which mitigates space charge effects.

5. The apparatus of claim 4 wherein said cathode and said anode are spaced at greater distance commesurate with said mitigation of space charge effects.

6. The apparatus of claim 1 wherein said cathode and said anode are constructed using field emission materials.

7. The apparatus of claim 1 wherein said cathode and said anode are constructed using insulating film coatings.

8. The apparatus of claim 1 wherein said cathode is formed on a back side of a computer chip substrate, whereby heat may be directly pumped from said computer chip substrate.

9. The apparatus of claim 1 wherein said supply of electrical power is continuously variable over a range of current output.

10. The apparatus of claim 1 wherein said anode is characterized by having a minimum work-function.

11. A vacuum diode comprising:
    a) a cathode having a work-function consistent with copious electron emission at temperatures less than 400 degrees Centigrade,
    b) an anode having a work-function consistent with copious electron emission at temperatures less than 400 degrees Centigrade,
    c) a vacuum separating said cathode and said anode,
    d) a supply of electrical power capable of supplying to said vacuum diode a direct current at suitable voltage,
    e) said cathode being in thermal contact with a mass from which heat is to be removed,
    f) said anode being in thermal contact with a mass to which heat is to be carried, the improvement wherein being minimizing said work-function of said anode whereby a contact potential is produced.

12. The apparatus of claim 11 wherein said cathode is constructed from a material capable of copious electron emission at the temperature of said mass from which heat is to be removed.

13. The apparatus of claim 11 wherein said work-function of said cathode is low enough to ensure space charge saturation at the temperature of said mass to be cooled.

14. The apparatus of claim 11 wherein said work-function of said cathode is the maximum consistant with space charge saturation at the temperature of said mass to be cooled.

* * * * *

UNITED STATES PATENT AND TRADEMARK OFFICE
CERTIFICATE OF CORRECTION

PATENT NO. : 5,722,242

DATED : Mar 3, 1998

INVENTOR(S) : Jonathan S. Edelson

It is certified that error appears in the above-indentified patent and that said Letters Patent is hereby corrected as shown below:

ON THE TITLE PAGE:

ITEM [56] References Cited, OTHER PUBLICATIONS, add

J. Appl. Phys, vol.76 No.7, pp 4362-4366 Mahan, Thermionic refrigeration Oct. 1994.

Column 7, line 15, add
Background-Thermionic Refrigeration

In the closest known prior art, G.D. Mahan examined the concept of thermionic refrigeration (J. Appl. Phys 76 (7) 1994 October 1 pp 4362 - 4366). In this paper, a number of theoretical aspects of thermionic refrigeration were explored, with the conclusion that refrigeration at or about room temperature would not be possible. Mahan does suggest, however, that thermionic refrigeration would be possible at elevated temperatures, though he does not give design specifics.

Mahan proposed a device, in general terms, consisting of a gas-filled diode in which cathode and anode were separated by a distance of at least one millimeter. His calculations determined that such a device could not work, because space charge effects would overwhelm the effective operation of the device, providing what Mahan believed was a natural limit to the operation of all thermionic cooling devices. In so concluding, however, Mahan did not take into account the effect of his prior assumptions concerning the construction of the device he based his calculations upon. The utilization of a Vacuum Diode Heat Pump, as discussed below, mitigates space charge effects by utilizing

UNITED STATES PATENT AND TRADEMARK OFFICE
CERTIFICATE OF CORRECTION

PATENT NO. : 5,722,242
DATED : March 3, 1998
INVENTOR(S) : Jonathan S. Edelson

It is certified that error appears in the above-indentified patent and that said Letters Patent is hereby corrected as shown below:

an entirely different form of construction.

Signed and Sealed this

Fourth Day of August, 1998

Attest:

BRUCE LEHMAN

Attesting Officer

Commissioner of Patents and Trademarks